Sept. 10, 1946.　　　　E. WATSON　　　　2,407,593
HAY STACKING ATTACHMENT FOR TRACTORS
Filed Feb. 20, 1945　　　3 Sheets-Sheet 1
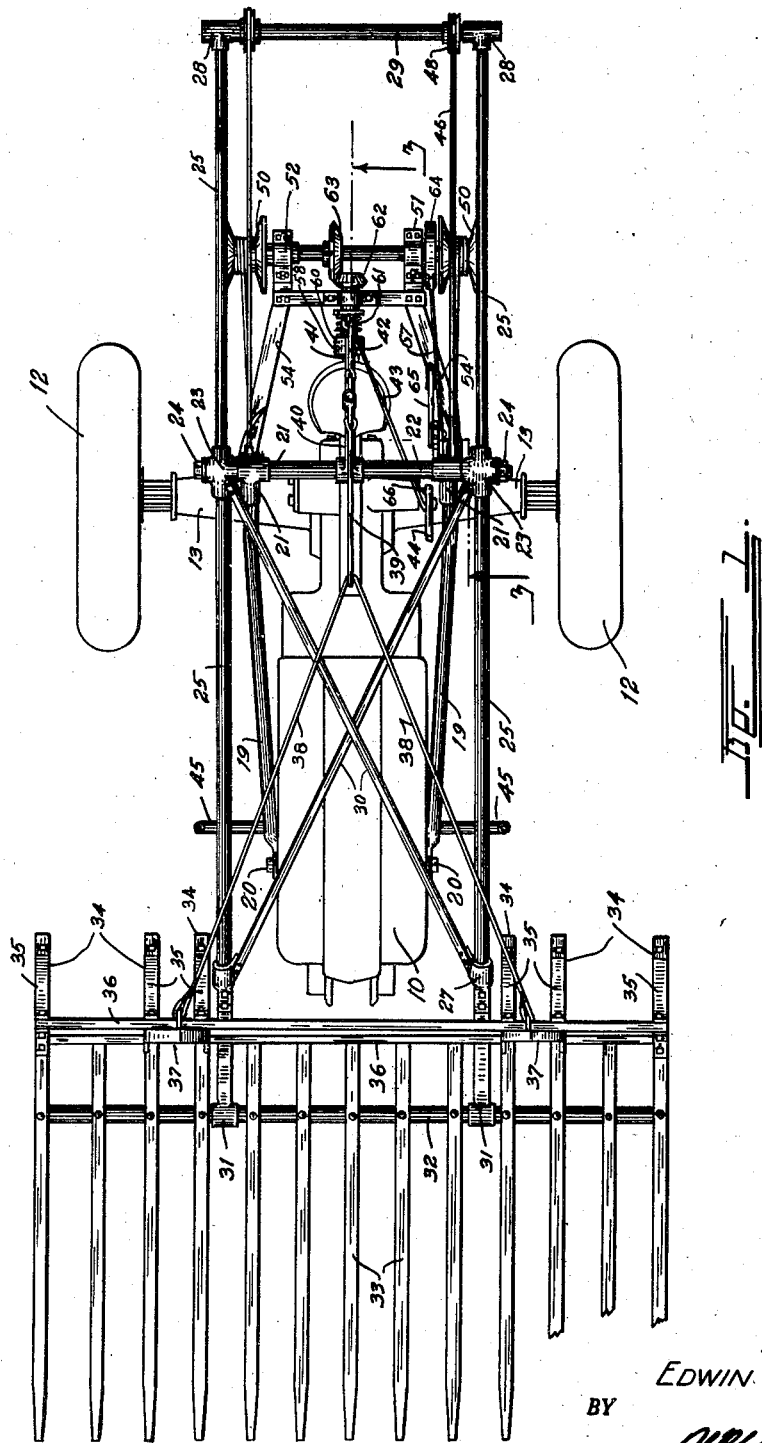
INVENTOR.
EDWIN WATSON
BY
ATTORNEY

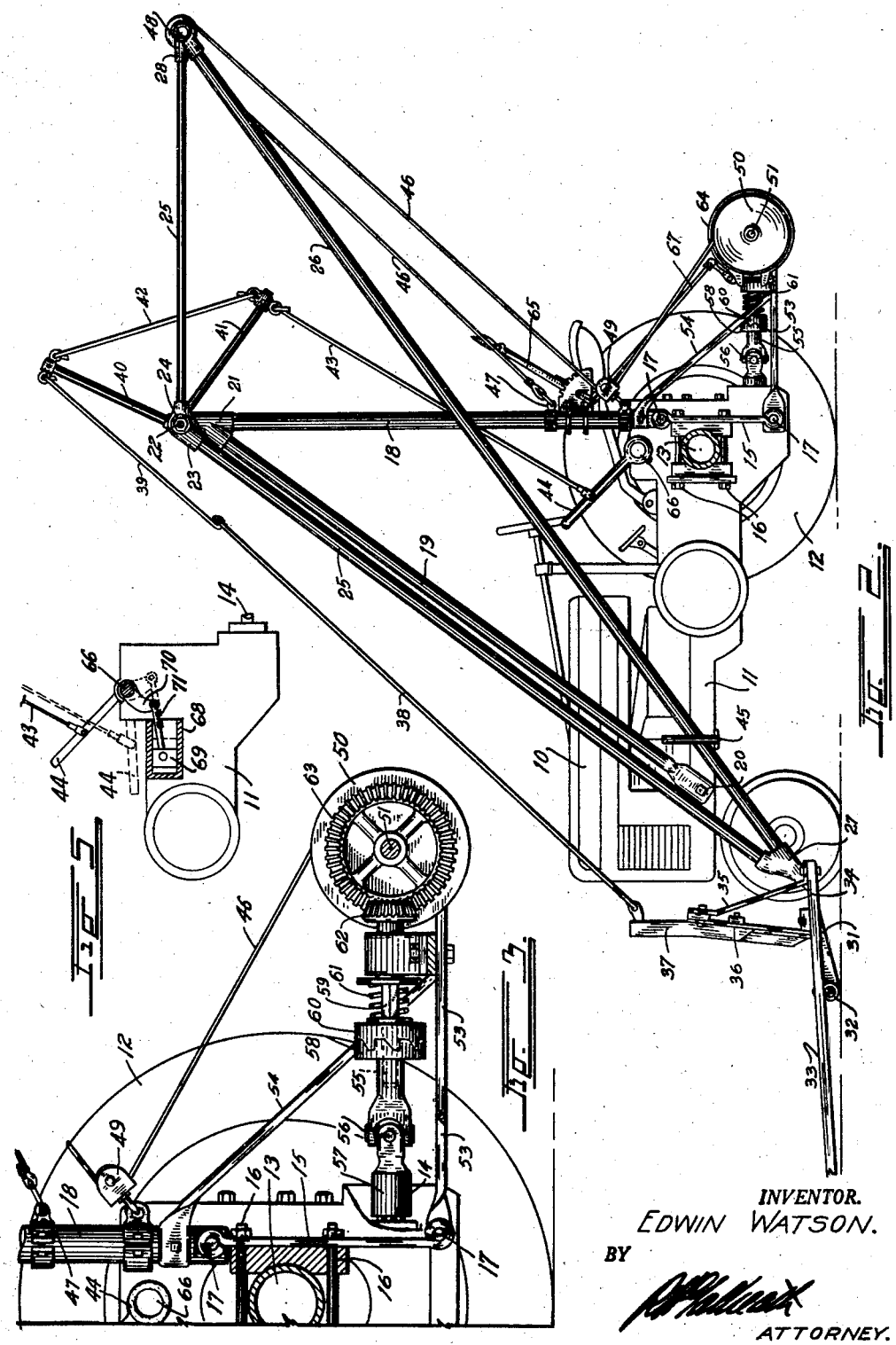

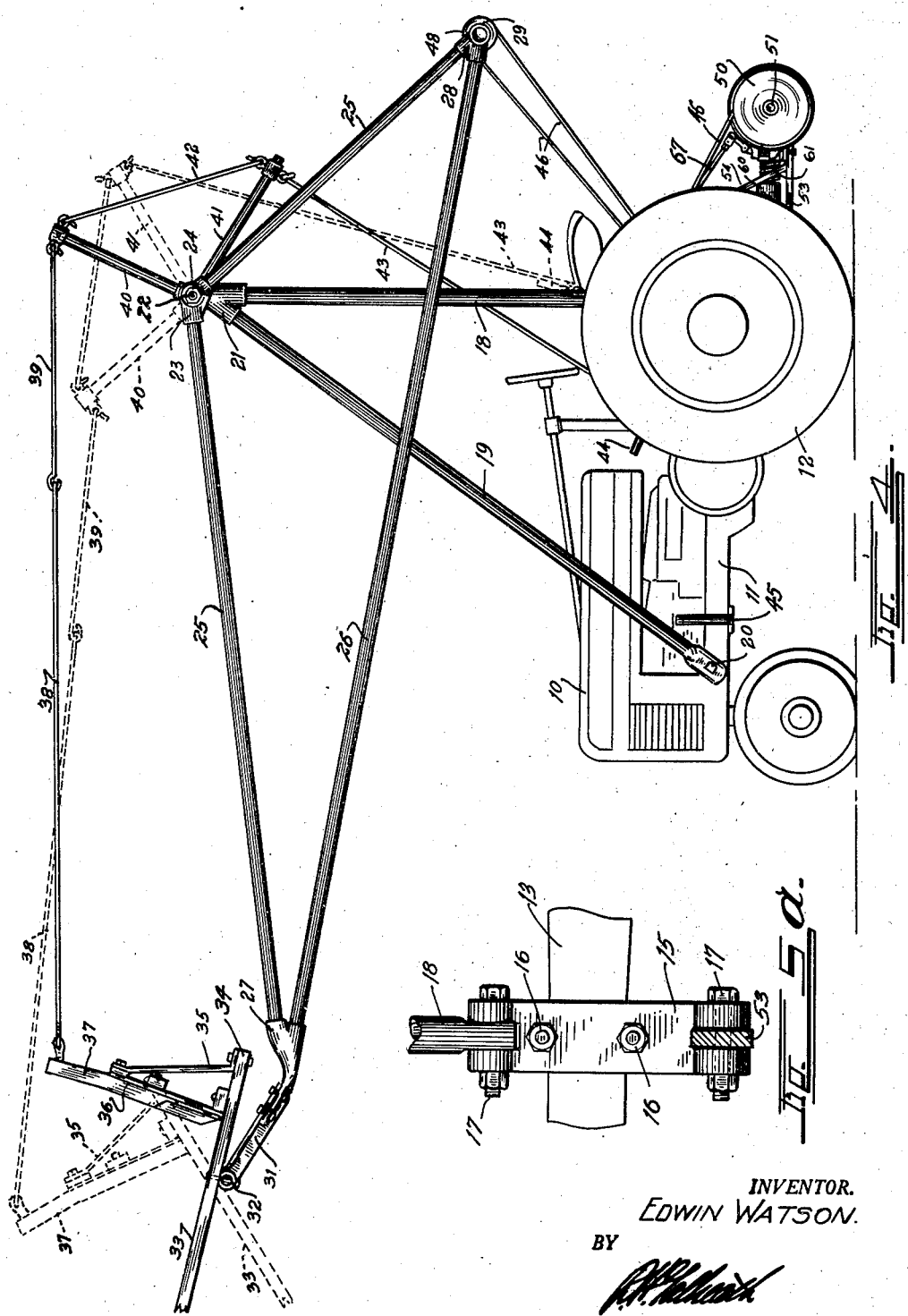
Sept. 10, 1946.  E. WATSON  2,407,593
HAY STACKING ATTACHMENT FOR TRACTORS
Filed Feb. 20, 1945  3 Sheets-Sheet 3
INVENTOR.
EDWIN WATSON.
BY
ATTORNEY.

Patented Sept. 10, 1946

2,407,593

UNITED STATES PATENT OFFICE 2,407,593

HAY STACKING ATTACHMENT FOR TRACTORS

Edwin Watson, near Littleton, Colo.

Application February 20, 1945, Serial No. 578,912

2 Claims. (Cl. 214—140)

This invention relates to a hay stacking attachment for tractors and has for its principal object the provision of a highly efficient stacking mechanism which can be quickly and easily attached to or detached from a standard farm tractor; which will employ the power take-off of the tractor for operation of the stacker; which can be used as a highly maneuverable buck rake; and which will elevate the hay to an exceedingly high elevation and conveniently discharge the same upon the stack.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a plan view of the improved stacker in place on a typical tractor;

Fig. 2 is a side view thereof illustrating the rake in the lowered position;

Fig. 3 is an enlarged detail section taken on the line 3—3, Fig. 1;

Fig. 4 is a side view thereof illustrating the rake in the elevated position;

Fig. 5 is a diagrammatic view, illustrating the operation of a conventional, hydraulically-operated, implement lift lever of a typical tractor; and Figure 5a is a fragmentary enlarged detail of the means for attaching the stacker to the tractor rear axle.

In the drawings, a typical tractor is illustrated at 10, with its chassis frame at 11, rear wheels at 12, rear axle housing at 13, power take-off shaft at 14, and hydraulically-operated implement lift lever at 44. In a conventional tractor of this type the lever 44 is mounted on a lift shaft 66. The shaft 66 may be rotated forwardly through the medium of a ram cylinder 68 and a ram piston 69. The piston 69 is connected to a crank member 70 by means of a connecting rod 71, as shown in the diagram of Fig. 5.

The tractor is adapted for receiving the stacker by clamping two attachment plates 15 to the rear axle housing 13 by means of suitable clamping bolts 16. The two plates 15 are slotted at their tops and bottoms and provided with attachment bolts 17, which pass through aligned openings across the slots therein.

The stacker comprises two upright posts 18, the lower extremities of which are formed with tongues to pass into the upper slots of the plates 15 and be secured therein by means of the bolts 17. The posts 18 are braced from the chassis frame 11 by means of diagonal braces 19, the lower extremities of which are bolted to the frame 11 by means of suitable attachment bolts 20.

The upper extremities of the posts 18 and the braces 19 fit within fittings 21, which support a horizontal pivot shaft 22 over the tractor. The pivot shaft projects outwardly from the fittings 21 at each side of the tractor to receive a frame fitting 23. The frame fittings 23 are held in place on the shaft 22 by means of suitable nuts 24.

A triangular swinging frame is mounted on each of the frame fittings 23 at each side of the tractor. Each of the frames consists of two angularly extending members 25 and a base member 26. The two members 25 extend from the frame fittings 23 and terminate in a forward fitting 27 and a rearward fitting 28.

A sheave shaft 29 is mounted in the two rearward fittings 28 and extends horizontally between the triangular frames. Two diagonally-extending guy members 30 extend between the fittings 27 and 23 over the tractor to prevent side swing of the triangular frames. It can be readily seen that the two triangular frames can be rocked or tilted as a unit on the shaft 22.

The forward fittings 23 are provided with arms 31 which extend forwardly to support a rake shaft or pipe 32, the latter being rotatable in the former. The rake pipe 32 supports a plurality of parallel spaced-apart rake teeth 33 which extend forwardly and rearwardly from the pipe 32. Certain of the teeth extend further rearward, as indicated at 34, to provide bases for braces 35 which support a rake back 36.

Two back posts 37 extend above the back 36, to which a back-supporting cable 38 is attached. The cable 38 is looped intermediate its extremities over a link 39 by means of which it is connected to a tilting arm 40 mounted on the pivot shaft 22. A second arm 41 projects from the shaft 22 and is tied to the arm 40 by means of a strut 42. The arm 41 is connected through a cable 43 with the hydraulically-operated implement lift lever 44 on the tractor.

The forward extremities of the two triangular frames are supported in their lowermost position by means of a cross-member 45 secured transversely of the tractor and projecting outwardly from each side thereof to receive the triangular frames as they descend.

The forward extremities of the frames are elevated by means of a pair of lifting cables 46, each of which extends from a fixed connection 47 on each of the posts 18 rearwardly over a sheave wheel 48 on the sheave shaft 29, thence forwardly to an idler sheave 49 on the posts 18, thence rearwardly to a winding drum 50.

The two winding drums 50 are mounted on the extremities of a drum shaft 51, which is carried in suitable boxes 52 on the rearward extremities of shaft frame members 53. The forward extremity of each of the shaft frame members is turned vertically so that it may be passed into the lower slot of each of the attachment plates 15 and secured therein by the bolts 17. The rearward extremities of the frame plates 53 are supported from diagonal braces 54 extending to the posts 18.

The mechanism for driving the drum shaft is shown more in detail in Fig. 3, and comprises a hollow drive shaft 55 containing a universal joint 56 and a splined collar 57, which slips over the splined extremity of the standard power take-off shaft 14 of the tractor.

A toothed clutch 58 is fixed on the shaft 55. A square pinion shaft 59 fits within the hollow drive shaft 55 and is freely rotatable therein. A second toothed clutch disc 60 is slidable on the square shaft 59, and is constantly urged into engagement with the first clutch 58 by means of a compression spring 61. The shaft 59 terminates in a drive pinion 62, which meshes with a bevel gear 63 on the drum shaft 51.

It can be readily seen that, when the power take-off 14 is actuated from the tractor, it will rotate the pinion 62 to cause the drums 50 to reel in the cable 46. This pulls the rearward extremities of the triangular frames downwardly, causing the forward extremities thereof to swing upwardly about the axis of the shaft 22, as shown in Fig. 4.

Should the load be too excessive, or should the rake teeth strike some immovable object, the reaction pressure on the teeth of the clutch discs 58 and 60 will force the latter from the former, allowing the disc 58 to rotate without rotating the shaft 59.

The shaft 51 is provided with a brake drum 64 for holding the shaft in any desired position. The brake drum is operated through the medium of a brake lever 65 within reach of the driver. Operation of the lever 65 either stops rotation of the shaft 51 or releases it for rotation, as desired. Operation of the implement lift lever 44 in one direction releases the tension in the cable 43 to allow the forward extremities of the rake teeth to tilt downwardly to discharge the load upon the stack.

It is believed the operation can be readily understood from the foregoing description. Briefly, the tractor is driven forwardly to collect hay on the rake teeth 33, similar to a buck rake. The load is then driven to the stack while the power take-off is operated to cause the drums 50 to wind in the cable so as to elevate the hay to its uppermost position.

The tractor is then maneuvered to place the load of hay over the stack, and the hydraulic implement lifting lever 44 is operated to tilt the teeth downwardly to allow the load to slide upon the stack.

It will be noted that the teeth 33 can be raised and lowered at their points while in their lowermost position so that the device can be operated as a buck rake without using the stacker. It will also be noted that the tractor may be operated independently of the reels 50 or both may be operated simultaneously.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A hay stacking attachment for tractors comprising: attachment members arranged for attachment to the rear axle of said tractor; upright posts detachably secured to said attachment members at their lower extremities; diagonal braces supporting said posts in a vertical position; means for detachably attaching said braces to said tractor; a horizontal shaft supported between the upper extremities of said posts; two triangular frame members tiltably mounted at their apexes on said shaft; a rake tiltably mounted on the forward extremities of said triangular frame members; a flexible member extending from and supporting said rake in a horizontal position; and means for connecting said flexible member with the implement lifting lever of said tractor so that operation of said latter lever will allow said rake to tilt; a drum-supporting frame detachably attached to said attachment members and extending rearwardly therefrom; means for supporting said frame from said posts; a horizontal drum shaft carried by said frame; drums on the extremities of said shaft; flexible means extending between said drums and the rearward extremities of said triangular frames so that rotation of the drums will pull the rearward extremities of the frames downwardly to lift said rake member; brake means for resisting rotation of said drum shaft when desired; drive means for driving said drum shaft; and means for detachably attaching said drive means to the power take-off of said tractor.

2. A hay stacking attachment for tractors comprising: attachment members arranged for attachment to the rear axle of said tractor; upright posts detachably secured to said attachment members at their lower extremities; diagonal braces supporting said posts in a vertical position; means for detachably attaching said braces to said tractor; a horizontal shaft supported between the upper extremities of said posts; two triangular frame members tiltably mounted at their apexes on said shaft; a rake tiltably mounted on the forward extremities of said triangular frame members; a flexible member extending from and supporting said rake in a horizontal position; means for connecting said flexible member with the implement lifting lever of said tractor so that operation of said latter lever will allow said rake to tilt; a drum-supporting frame detachably attached to said attachment members and extending rearwardly therefrom; means for supporting said frame from said posts; a horizontal drum shaft carried by said frame; drums on the extremities of said shaft; flexible means extending between said drums and the rearward extremities of said triangular frames so that rotation of the drums will pull the rearward extremities of the frames downwardly to lift said rake member; a bevel gear on said drum shaft; a bevel pinion meshing with said gear; a pinion shaft extending from said pinion; a drive shaft; means for detachably attaching said drive shaft to the power take-off of the tractor; and a yieldable connection between said drive shaft and said pinion shaft which will allow the former to rotate without rotating the latter when the load on the rake exceeds a pre-determined amount.

EDWIN WATSON.